United States Patent

[11] 3,620,789

| [72] | Inventor | David H. Solomon |
| | | Summit, N.J. |
| [21] | Appl. No. | 814,925 |
| [22] | Filed | Apr. 10, 1969 |
| [45] | Patented | Nov. 16, 1971 |
| [73] | Assignee | Georgia Kaolin Company |

[54] SURFACE MODIFIED CLAYS AND METHODS OF MAKING THE SAME
8 Claims, 2 Drawing Figs.

| [52] | U.S. Cl. | 106/288 B, 106/308 N |
| [51] | Int. Cl. | C09c 1/28 |
| [50] | Field of Search | 106/72, 288 B, 308 N |

[56] References Cited
UNITED STATES PATENTS

| 2,999,080 | 9/1961 | Wilcox | 106/308 N |
| 3,029,209 | 4/1962 | Ferrigno | 106/308 N |
| 3,234,003 | 2/1966 | Sawyer et al. | 106/72 |

*Primary Examiner*—James E. Poer
*Attorney*—Buell, Blenko & Ziesenheim

ABSTRACT: A surface modified kaolin and method for producing the same is provided in which a kaolin is dried and then mixed with an amine in a relatively anhydrous organic diluent to provide an amine modified clay independent of exchange capacity of the clay.

INVENTOR
David H. Solomon

SURFACE MODIFIED CLAYS AND METHODS OF MAKING THE SAME

This invention relates to surface modified clays and methods of making the same and particularly to surface modified kaolin and methods of making such surface modified kaolin. By "kaolin" I mean that group of clays which consists of kaolinite, halloysite, dickite, nacrite and anauxite and references herein to kaolin shall mean that group of clays or any one of them.

Most specifically, this invention is directed to the preparation of improved fillers for use in organic polymer compositions. In particular, it is concerned with the modification and treatment of kaolin clay so as to render the clay more readily dispersible and more of a reinforcing agent in the organic polymer compositions.

Kaolin clays in their naturally occurring state are hydrophilic and, consequently, difficulties are often experienced in incorporating such clay into organic polymer systems. In addition, the hydrophilic nature of the kaolin surface presents difficulties in compounded plastic composition, since water is more readily adsorbed onto the hydrophilic surface than is often desirable. Numerous methods have been described in the literature for the modification of the kaolin surface with organic materials so as to convert the naturally hydrophilic surface into one with organophilic properties. In particular, the modification of the kaolin surface with derivatives, and particularly salts, of organic amines has been described, and the properties resulting from this treatment have been claimed to give advantageous properties to polyesters, to elastomers, and to plastics. Typical of such prior art practices are those disclosed in Wilcox U.S. Pat. No. 2,999,080, Ferrigno U.S. Pat. No. 3,032,431 and Albert U.S. Pat. No. 2,948,632.

The methods which have been described rely on the fact that kaolin possesses at or near its surface inorganic cations which can be exchanged for the organic cation. Thus, the reaction is termed a cation exchange reaction and involves the cation of the organic interchanging with the inorganic cations, which are naturally present on the kaolin surface.

We have found that treatment of a kaolin, which has been dried so that the surface water content, as measured at 110° C., is less than 1 percent and preferably less than 0.7 percent by weight of the clay, in an anhydrous organic solvent with free amine, results in organic modified clays with unique and desirable properties. This technique of modifying the clay surface with organic amines is distinguished from those described in the prior art by the following features:

1. It does not involve directly, nor is it limited by, the base exchange capacity of the mineral.
2. The cations present on the mineral surface, either in the natural state or as a result of subsequent treatments, are not displaced by the organic amine.
3. The bond formed between the amine and the kaolin surface is strong and more resistant to degradation than the products of the prior art.

Many organic solvents are satisfactory for carrying out the treatment of this invention provided they fulfill the requirement of being anhydrous. In the extreme example of this treatment, the solvent can be dispensed with and the dried kaolin treated with the amine in for example a fluidized bed; although in general, this procedure does not give such desirable properties as a similar treatment carried out in an organic solvent. Solvents typical of those used in this invention are:

1. trichloroethylene
2. carbon tetrachloride
3. benzene and members of the homologous aromatic series
4. esters
5. nitroparaffins
6. nitroaromatics
7. ethers
8. ketones
9. petroleum ether and higher members of this series and any solvent containing as substituents groups which are less polar than an organic amine Of particular value is the use of trichloroethylene because of its nonpolar and nontoxic characteristics. Petroleum fractions are also usable.

In general, I have found that the lower the water content of the clay surface the better the product formed on treatment with the organic amine. But compromises can be reached; for example, where the water content approaches 1 percent, satisfactory organic modified kaolins can be prepared if the amount of organic is increased above the optimum level for the fully dried clay. Thus, in some situations it may be commercially desirable to sacrifice slightly the technical improvement resulting from completely drying the clay because of the easier production requirements to be found in the use of the partially dried clay.

The amount of amine required to modify the surface also varies with the end use for which the clay is being prepared. In general, amine treatments of up to 2 percent can be used, but no general rules can be laid down for any given optimum concentration of amine. With polymeric materials greater amounts may be used.

In general, a wide range of amines has proven satisfactory for use in this process, provided they are one of the class of compounds of the general formula

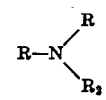

in which R or $R_1$ equals alkyl or hydrogen and $R_2$ equals an alkyl chain or a substituted alkyl chain. A limitation on the use of amines where other functional groups are present, is that the amine group required for adsorption must be the most polar part of the molecule.

Thus, satisfactory products and treatments have been devised for primary, secondary, and tertiary amines, as will be shown in the examples below, for amine derivatives which contain also ester, aromatic, and other functional groups, and for amines in which polymerizable groups are also present within the same molecule.

The selection of the amine treatment required for a kaolin can be governed to some extent by the type of polymer to be used in the final fabrication. The effect of various amines on viscosity is shown in the drawings in which.

Figure 1:
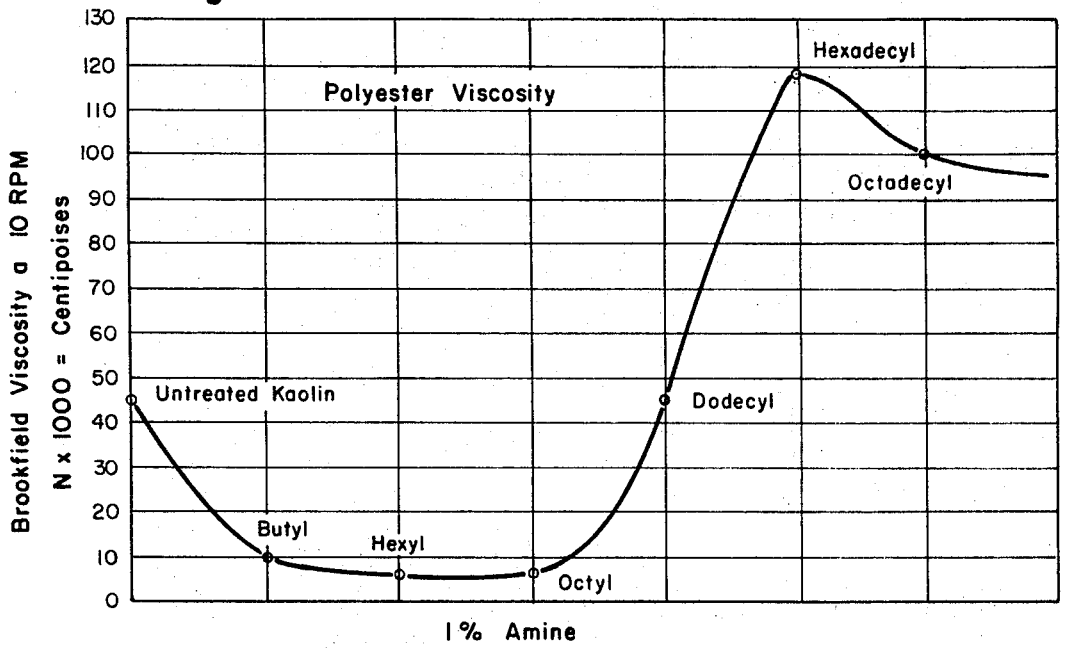
FIG. 1 is a graph of viscosity versus amine chain length in polyester.
Figure 2:
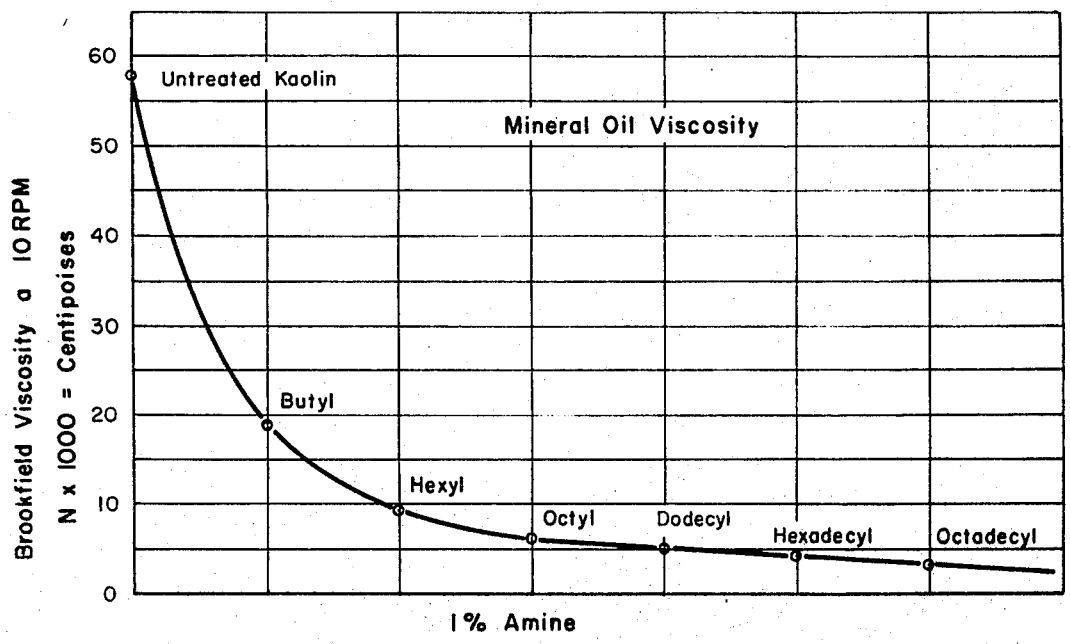
FIG. 2 is a graph of viscosity versus amine chain length in mineral oil.

Referring to the drawings, with the relatively polar polyester type compositions, viscosity of a series of amines which differ in the carbon chain lengths is shown in FIG. 1, where it can be seen that the minimum viscosity is reached with approximately six to eight carbon atoms in the chain. On the other hand, mineral oil viscosities show a gradual decrease with increasing chain length as shown in FIG. 2. This is a situation somewhat similar to that to be expected in rubber and similar nonpolar polymers. The products of this invention give much better dispersion in e.g., polyesters and mineral oil than the products of the prior art.

The precise theoretical reasons for the success of the above treatment have not been fully established, but it has been shown that surface acidity increases with a decrease in the water content of the clay surface; and this is a possible explanation for the treatments described. It should be noted that since these treatments do not involve directly the cations present naturally on the clay surface, the products will differ significantly from those of the prior art. It is likely, although not necessary, that interaction involves the crystal edges and the strong acid sites developed on these clays on drying.

Accordingly, it is a principle object of the present invention to furnish novel modified kaolin fillers for use in organic polymer systems. These include polyesters, polyurethane, rubbers, polyvinyl chloride, and polyethylene type compositions. It is a further object of the invention to teach a simple, practical method of preparing these modified kaolins.

It should be noted that the process described here works exceedingly well for treatment with organic amines; and this is in contrast to prior developments in this field where invariably the amine salt was necessary for a satisfactory treatment. In addition, the use of amines as opposed to amine salts eliminates a major problem, that is, of removing the salt residues after reaction.

A further object and advantage of this invention is the formation of treated kaolin surfaces which result in a reinforcing effect in some polymer compositions. This aspect applies to those amines which contain within the molecule polymerizable groupings usually of the carbon-carbon unsaturated type.

The precise level of amine treatment required varies with the surface area and particle size of the kaolin used. In general terms, the larger the surface area and the smaller the particle size, the greater the amount of amine required to achieve the desirable treatment.

As stated above, the amine treatment is also a function of the water content and at increased water contents up to 1 percent, increased amine levels are required.

This invention can perhaps be better understood by reference to the following examples which illustrate, but do not limit the invention:

EXAMPLE I

This example illustrates the influence of the amount of residual water on the kaolin on the effectiveness of the amine treatment. A processed kaolin with average particle size, 0.55 micron, was dried and samples removed which had a residual water content of 0.2, 0.4, 0.5 and 1 percent. Each of these clays was then slurried in trichloroethylene so that the solids content was approximately 20 percent. To each of these slurry, hexyl amine was added incrementally until optimum dispersion resulted.

The amount of hexyl amine required for each clay is shown in the table below. It can readily be seen that the drier the clay the lower the amine content required for dispersion. Furthermore, tests on the hydrophobic nature of these clays show that the modified clay made from the dried kaolin, that is, sample 1, was much more hydrophobic than where the initial clay contained 1 percent moisture.

TABLE I.—RELATIONSHIP BETWEEN RESIDUAL WATER CONTENT OF CLAY[1] AND AMOUNT OF AMINE REQUIRED

| Sample Number: | Water content of clay,[2] percent | For dispersion,[3] wt. percent[4] |
|---|---|---|
| 4 | 1 | 2.0 |
| 3 | 0.75 | 1.0 |
| 2 | 0.5 | 0.8 |
| 1 | 0.0 | 0.5 |

[1] The clay used for these experiments was a processed clay, i. e. degritted and deflocculated.
[2] As measured at 110° C.
[3] These experiments were conducted at 20 weight percent clay in trichloroethylene.
[4] Hexylamine required for dispersion in trichloroethylene.

The test for hydrophobicity was carried out by sprinkling the modified clay onto the surface of water and observing the time taken for the water to wet the organic clay complex.

Similarly, where the amine used to modify the clay was butyl amine, the results shown in table II were obtained and where octadecyl amine was used, the results shown in table III were found.

When product is made by conventional cationic exchange methods it is much more readily wetted by water.

EXAMPLE I

TABLE II.—RELATIONSHIP BETWEEN RESIDUAL WATER CONTENT OF CLAY AND THE AMOUNT OF BUTYLAMINE REQUIRED FOR DISPERSION

| Sample No. | Water content of clay (approximate), percent | Amount of butylamine[1] |
|---|---|---|
| 1 | 1.0 | 1.5-2.0 |
| 2 | 0.75 | 1 |
| 3 | 0.50 | 1 |
| 4 | 0.0 | 0.5 |

[1] Required for dispersion in trichloroethylene, percent.

TABLE III

Relationship Between Residual Water Content of Clay and the Amount of Octadecylamine Required for Dispersion

| Sample No. | Water Content of Clay (approx.) | Amount of Octadecylamine Required for Dispersion in Trichloroethylene |
|---|---|---|
| 1 | 1.0% | 0.8% |
| 2 | 0.75% | 0.5% |
| 3 | 0.50% | 0.5% |
| 4 | 0.0% | 0.1%-0.2% |

EXAMPLE II

This example illustrates the influence of the carbon chain length of primary amines on the properties of the clay. Primary aliphatic amines with carbon chain links from four up to 18 carbon atoms were used to modify a dried, processed kaolin with average particle size 0.55 micron. The general treatment conditions were those described above, that is, the clay was slurried in trichloroethylene to which had previously been added the amine. After stirring for 30 minutes, the clay was removed by filtration and dried. The viscosities of these treated clays in a polyester resin° and in mineral oil= are shown in Figures 1 and 2.

It should be noted that the polyester resin used was Selectron 5067* and the mineral oil was a paraffin grade hydrocarbon, Primol 355 marketed by Humble Oil. The polyester viscosity represents a moderately polar organic system and the mineral oil a non-polar system which has a similarity to rubber in properties. The viscosities shown in the Table clearly indicate that in the polyester system optimum viscosity (minimum viscosity) is obtained with the carbon chain length of between 4 and 6 carbons, whereas in rubber the higher the chain length or the longer the chain length the more desirable the treatment.

*Supplied by Pittsburgh Plate Glass Co.

°Viscosities were measured at 10 r.p.m. with spindle No. 5 on a Brookfield Viscometer. 40 pt. of treated clay were mixed with 60 pts. of polyester resin.

=Viscosities were measured at 10 r.p.m. with spindle No. 5 on a Brookfield Viscometer. 20 pts. of treated clay were mixed with 80 pts. of mineral oil.

This is shown by the lower viscosity given with the higher chain length amine modified clays. These clays are particularly noted for their high bulking factor, which again is an indication of the extremely good dispersion obtained by this process. When compared with products made by the prior art, it is found that the bulking value is generally of the order of 60-70 percent that of the untreated clay and this is a clear indication of the effectiveness of this treatment procedure.

EXAMPLE III

This example illustrates the use of a secondary amine as the modifying agent for the clay. The amine modified clay was prepared as described in example II. The secondary amine used was dioctyl amine at 1 percent wt. of clay. The properties were as follows:
- viscosity in polyester, 34,000 c.p.s.
- viscosity in mineral oil, 12,000 cps.

EXAMPLE IV

This example illustrates the use of a tertiary amine as the modifying agent. Treatment was as described above. Dimethyloctadecylamine gave the following properties:
- viscosity in polyester, 86,500 c.p.s.
- viscosity in mineral oil, 3,400 cps.

EXAMPLE V

This illustrates the use of amines which can subsequently undergo reaction and resin formation with other compounds. A dried clay of average particle size, 0.55 micron, was slurried in trichloroethylene so as to give a 20 percent solids slurry. To this slurry was added melamine (5 percent by weight of the clay) and then after 30 minutes a solution of paraform (same wt. as melamine) in butanol.

The reaction was allowed to proceed for a further 30 minutes to produce a melamine formaldehyde coating on the clay surface.

Similarly, the use of urea gave a clay which could be converted to a urea formaldehyde product. It was also noted that the melamine clay adduct and the urea clay adduct could be used successfully without the formaldehyde modification as fillers in molding phenolic melamine and urea formaldehyde resins.

EXAMPLE VI

This illustrates the use of amines with groups capable of undergoing vinyl polymerization. Modification of the clay as described above with vinyl pyridine 5-methyl 2-vinyl pyridine, dimethyl amino ethyl methacrylate, tertiary butyl amino ethyl methacrylate, and monomers of this general type was carried out. The properties of these modified clays are listed below.

Properties of Treated Clay

| Sample No. | Viscosity in Polyester | Viscosity in Mineral Oil |
| --- | --- | --- |
| 1–Vinyl pyridine | 7,000 | 33,000 |
| 2–2-Methyl 5-vinyl pyridine | 6,000 | 32,000 |
| 3–Dimethylaminoethyl methacrylate | 4,000 | 28,000 |
| 4–Tert. butylaminoethyl methacrylate | 10,000 | 14,000 |

EVALUATION IN RUBBER FORMULATION

The formula used to evaluate the treated clay (this example and example VII):

| | |
| --- | --- |
| Plioflex SBR 1502 | 75.0 pts. |
| Clay filler | 39.0 pts. |
| Zinc oxide | 3.75 pts. |
| Coumarone resin | 5.64 pts. |
| Sulfur | 2.26 pts. |
| Santocure (marketed by Mansanto) | 1.50 pts. |

The rubber formulations were compounded on a two-roll mill and then cured.

The treated clays were much more readily incorporated into the rubber as shown by the time for dispersion:

| | |
| --- | --- |
| Untreated clays | 25 minutes |
| Clay 03 (dimethylaminoethyl methacrylate) | 10–15 minutes |
| Clay 04 (tert. butylaminoethyl methacrylate) | 10–15 minutes |

When the rubber compositions were cured for 10 minutes at 160° C., the following properties were given by the rubbers:

| Filler | Shor Hardness (after 72 hours) |
| --- | --- |
| Untreated clay | 59 |
| Clay 03 | 64 |
| Clay 04 | 64 |

EXAMPLE VII

The modified clays as prepared in example VI were further treated with 1 percent by weight of an organic peroxide or hydroperoxide and then used as the filler in rubbers or in polyesters. Greatly improved mechanical properties resulted and this suggests that polymerization from the surface and involving the amine residue had taken place.

RESULTS

| Modifying amine (1% on clay) | Properties of rubber [1] Shore Hardness (after 72 hours) |
| --- | --- |
| Dimethylaminoethyl methacrylate plus cumene hydroperoxide (1% on clay) | 64 |
| Tert. butylaminoethyl methacrylate plus cumene hydroperoxide (1% on clay) | 64 |
| Untreated clay | 59 |

[1] Formulation used was as in Example VI.

EXAMPLE VIII

This example illustrates the use of polymers which contain free amino groups as the modifying agent for the clay in place of the simple primary, secondary, and tertiary amines reported above. The "Versamides," which are marketed by General Mills, gave the properties shown below.

Similarly, the use of other polymers with residual amine groups gave results as shown in the following table:

| Properties of Versamid* | Modified Clay |
| --- | --- |
| Viscosity in Polyester | 6,500 |
| Viscosity in Mineral Oil | 4,000 |

The milling time of this modified clay under conditions used was 10 minutes. Untreated required 30 minutes.

*Versamid 140 was used.

PROPERTIES OF RUBBER MIXES

| | Shor Hardness |
| --- | --- |
| Untreated clay | 59 |
| Versamid 140 modified clay | 64 |

Similarly, when an acrylic polymer with a composition of tert. butylaminoethyl methacrylate/methyl methacrylate=70/30 and M. wt. 40,000 was used, the treated clay had the following properties:

- Viscosity in Polyester = 4,000
- Viscosity in Mineral Oil = 4,800

EXAMPLE VIII(a)

A further example of an amino polymer was a modification by melamine resin and urea formaldehyde resins. And this treatment ultimately gave products equivalent to those prepared in example V discussed above.

A dried clay was treated with a urea formaldehyde* as described in example I. Two types of treatments were used: First the urea-formaldehyde resin was adsorbed onto the clay and the product isolated in the normal manner. The results obtained were as follows:

| Wt. % Urea Formaldehyde on Solid Basis | Viscosity Polyester |
| --- | --- |
| 1% | 11,200 (Spindle No. 6) |
| 2.5% | 4,400 |

*F 240 N supplied by Rohm & Haas Company

In the second method the slurry after adding the urea-formaldehyde resin was heated, with stirring for 1/2 hour at 80° C. A clay treated in this manner with 5 percent urea-formaldehyde resin gave a polyester viscosity of 8,800 (Spindle No. 6). This clay was much more hydrophobic than a similar material prepared without the subsequent heat treatment.

Similarly, when a melamine formaldehyde resin (MM 55 HV, supplied by Rohm & Haas) was used at 5 percent by weight, the results were as follows:

No heat treatment—polyester viscosity 4,400 at 10 r.p.m.
After heating 1/2 hour at 80° C. polyester viscosity 4,000 at 10 r.p.m.

Once again the sample with the subsequent heat treatment was more hydrophobic than the untreated melamine formaldehyde-clay product.

EXAMPLE IX

This example illustrates the use of different solvents for the treatment of the clay with the amine. A clay with the particle size dimensions of 0.55µ was slurried in each of the following solvents:

carbon tetrachloride
trichloroethylene
petroleum ether fraction boiling point 40 to 60
petroleum ether fraction boiling point 80 to 100
benzene
toluene In each case, the clay was modified by treatment with 1 percent by weight of hexylamine. After the modified clay had been removed by filtration and dried, a comparison of the viscosities of these clays in polyester and in mineral oil showed no significant differences between the various treatments.

EXAMPLE X

This example illustrates the use of clays which have been subjected to difference pretreatments. A naturally occurring kaolinite, a kaolinite prepared by blunging, bleach and then acid precipitation, a predispersed kaolinite, and delaminated kaolinite were each modified by the process described above. A comparison of the original clay and the modified clay showed that in all cases the amine modification resulted in a greatly improved hydrophobic surface.

EXAMPLE XI

This example shows the applicability of the treatment to a nonkaolin mineral i.e., pyrophyllite.

Dried pyrophyllite was treated with 1 percent octadecylamine in Trichloroethylene. The viscosity of the untreated and treated minerals in Mineral Oil and Polyester is shown below:

| | Mineral Oil | Viscosity Polyester |
| --- | --- | --- |
| Untreated pyrophyllite | 1,200 c.p.s. | 10,000 c.p.s. |
| 1% Octadecylamine modified Pyrophyllite | 320 c.p.s. | 6,000 c.p.s. |

While I have described certain preferred embodiments and practices of my invention in the foregoing specification, it will be understood that this invention may be otherwise embodied.

I claim:

1. A process for modifying kaolin clays for use as fillers in organic polymer systems comprising the steps of drying the clay, slurrying the dry clay with an amine in a relatively anhydrous organic diluent, recovering the clay from the slurry and drying the residual clay to remove any residual organic diluent leaving the amine on said clay.

2. A process as claimed in claim 1 wherein the water content of the clay is controlled to less than 1 percent and preferably less than 0.7 percent by weight.

3. A process as claimed in claim 1 wherein the clay is reduced to a water content less than 0.7 percent by weight.

4. A process as claimed in claim 1 wherein the amine used to modify the clay surface is a monomeric amine in an amount not more than 1 percent by weight of the clay.

5. A process as claimed in claim 1 wherein the amine is a monomeric amine in an amount between about 0.2 percent to 0.6 percent by weight of the clay.

6. A process as claimed in claim 1 in which the modifying amine is a primary amine.

7. A process as claimed in claim 1 in which the modifying amine is a secondary amine.

8. A process as claimed in claim 1 in which the modifying amine is a tertiary amine.

* * * * *